United States Patent

Engel et al.

Patent Number: 5,111,711
Date of Patent: May 12, 1992

[54] COUPLING DEVICE FOR THE GEARSHIFT LINKAGE OF MOTOR VEHICLES

[75] Inventors: Michael Engel, Neuendorf; Karl-Heinz Pepping, Schleiden; Gunther Gebhardt, Stadtkyll, all of Fed. Rep. of Germany

[73] Assignee: Diehl GmbH & Co., Nuremberg, Fed. Rep. of Germany

[21] Appl. No.: 651,578

[22] Filed: Feb. 6, 1991

[30] Foreign Application Priority Data

Feb. 10, 1990 [DE] Fed. Rep. of Germany ....... 4004104

[51] Int. Cl.$^5$ .................. F16B 7/00; F16D 3/64; F16D 3/76
[52] U.S. Cl. .................. 74/473 R; 464/89; 403/383; 403/377
[58] Field of Search .............. 74/473 R; 403/377, 383, 403/372; 464/89, 162, 85, 180

[56] References Cited

U.S. PATENT DOCUMENTS

| | | | |
|---|---|---|---|
| 1,368,574 | 2/1921 | Romney | 464/85 |
| 1,904,745 | 4/1933 | Nowosielski | 464/85 |
| 2,154,651 | 4/1939 | Wodack et al. | 403/377 X |
| 2,326,201 | 8/1943 | Brumagin | 464/85 |
| 2,914,959 | 12/1959 | Fawick | 464/85 X |
| 3,003,339 | 10/1961 | Haushalter | 464/89 |
| 3,525,238 | 8/1970 | Cruz | 464/85 |
| 3,604,735 | 9/1971 | Hoffmeister | 403/377 X |
| 3,657,943 | 4/1972 | Bruhn, Jr. et al. | 403/372 X |
| 3,808,838 | 5/1974 | Bowen et al. | 464/89 |
| 4,033,020 | 5/1977 | Hudgens | 464/162 X |
| 4,479,786 | 10/1984 | De Bisschop | 464/89 |
| 4,492,129 | 1/1985 | Hasegawa | 403/372 X |
| 4,667,530 | 5/1987 | Mettler et al. | 464/89 X |
| 4,777,839 | 10/1988 | Lindholm et al. | 464/180 X |
| 4,787,878 | 11/1988 | Nikkel | 464/89 X |

FOREIGN PATENT DOCUMENTS

| | | |
|---|---|---|
| 0091608 | 10/1983 | European Pat. Off. . |
| 1843920 | 7/1961 | Fed. Rep. of Germany . |
| 1863471 | 10/1962 | Fed. Rep. of Germany . |
| 3806151 | 2/1989 | Fed. Rep. of Germany . |

*Primary Examiner*—Allan D. Herrmann
*Assistant Examiner*—Julie Krolikowski
*Attorney, Agent, or Firm*—Scully, Scott, Murphy & Presser

[57] ABSTRACT

A coupling device for effectuating the coupling of a gearshift rod or bar member which is connected with the transmission of a motor vehicle to a further gearshift rod or bar member which is connected with the shift lever for the motor vehicle. The two gearshift rods interengage at their adjoining end sections, and each possesses a cross-section which deviates from a circular configuration in order to ensure their interconnection being secured against rotation relative to each other. Between the interengaging end sections of the two gearshift rods, an intermediate element serves for the damping or absorption of sounds which are conducted through solids.

8 Claims, 1 Drawing Sheet

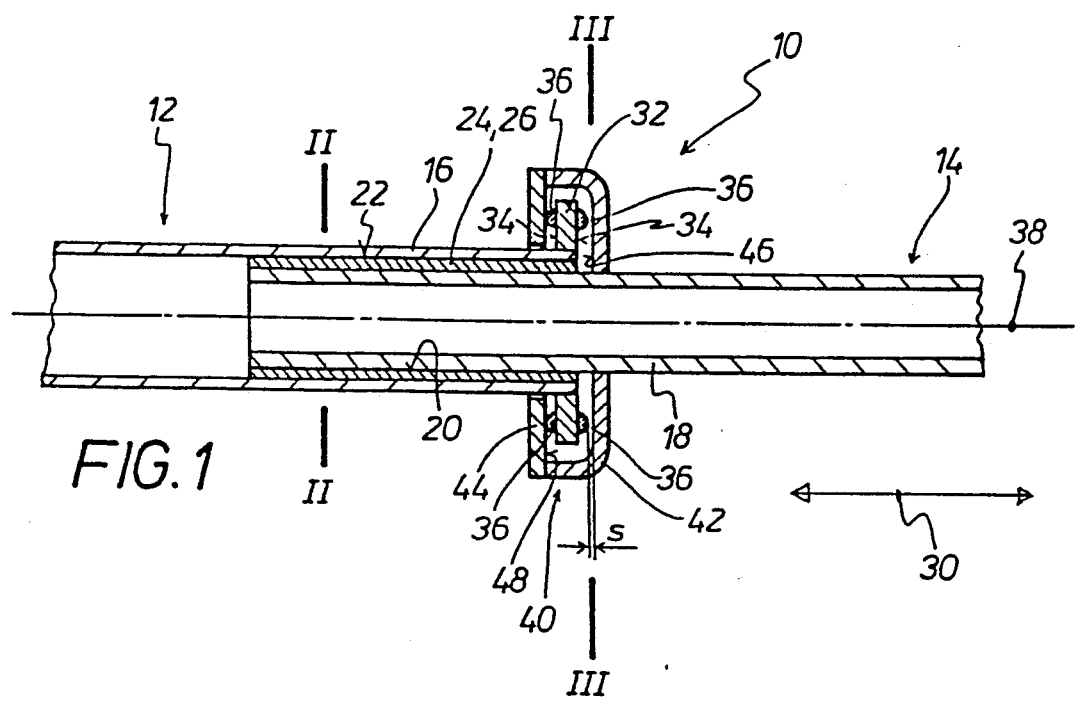
FIG.1
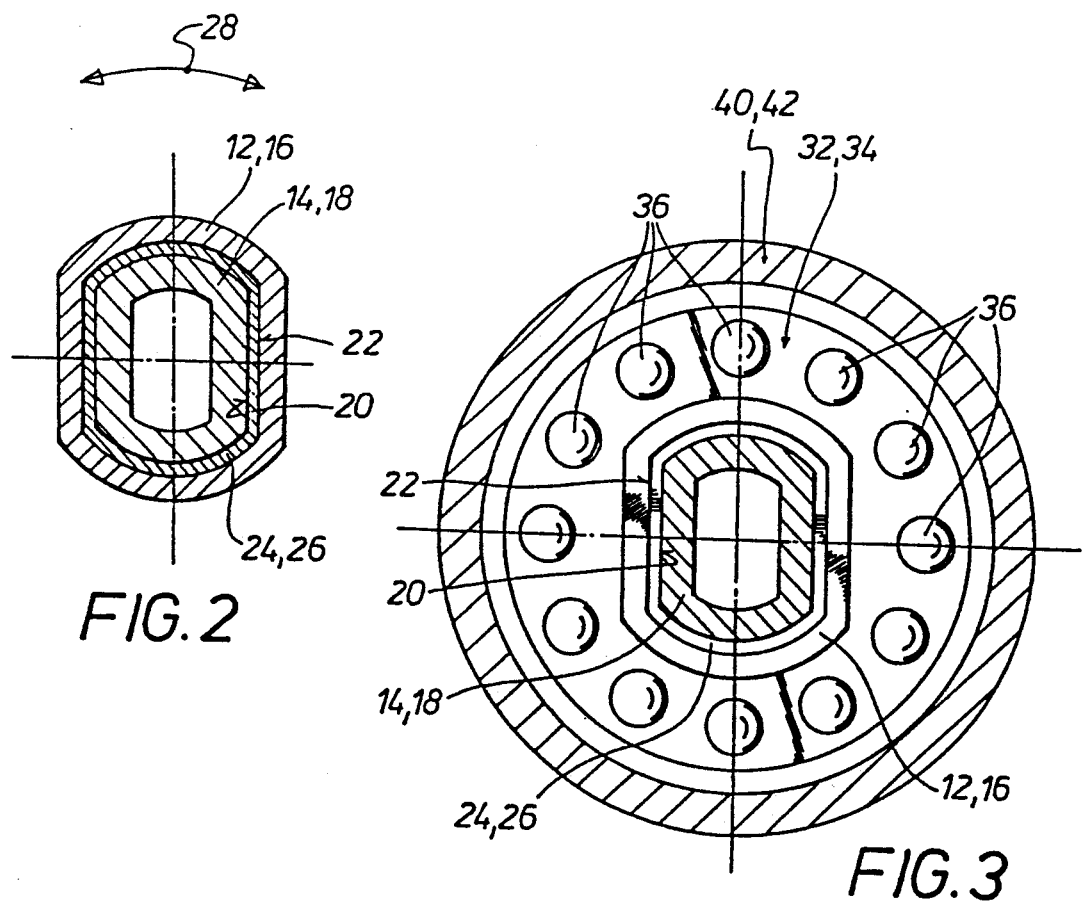
FIG.2
FIG.3

COUPLING DEVICE FOR THE GEARSHIFT LINKAGE OF MOTOR VEHICLES

BACKGROUND OF THE INVENTION

1. Field of the Invention

The present invention relates to a coupling device for effectuating the coupling of a gearshift rod or bar member which is connected with the transmission of a motor vehicle to a further gearshift rod or bar member which is connected with the shift lever for the motor vehicle, whereby the two gearshift rods interengage at their adjoining end sections, and each possesses a cross-section which deviates from a circular configuration in order to ensure their interconnection being secured against rotation relative to each other.

2. Discussion of the Prior Art

A coupling device of that type is described, for in the disclosure of German Patent 31 09 182 C1. In that particular case, the end sections of the two gearshift rods which interengage so as to be secured against rotation relative to each other are concentrically encompassed by a plurality of sleeve elements, and whereby pin connections are formed intermediate neighboring sleeve elements. A coupling device of that type, in view of the sleeves which are arranged concentrically superimposed about each other, is quite complex in its manufacture and especially in the assembly thereof, which has an unfavorable effect on the production costs for the coupling device.

A similar coupling device is described, for instance, in the disclosure of published European Patent Appln. 091 608. This coupling device which is known in the technology also possesses an extensive number of individual components so that during the manufacture thereof this resultingly entails the need for a considerable number of not quite insignificant assembling steps.

The disclosure of German Patent 38 06 522 A1 relates to the description of a power transmission linkage arrangement with a universal joint cage or housing, a sliding block which is fixed therein for the receipt of a linkage trunnion connector, and with the provision of elastic elements. Through the intermediary of this known power transmission linkage arrangement it is possible that the so-called external shifting system can be uncoupled from an internal shifting system in a manner such that no jerky or shock-like power peaks become noticeable at the shift lever or lever knob. This effect is achieved in that the universal joint cage or housing possesses a right-angled cutout, with the sliding block being configured to possess a square or rectangular shape in conformance with that of the cutout, and is maintained free from play at the circumference or, respectively, at the sides thereof by means of a retaining element only in the pivot plane about the axis of rotation, whereas in the longitudinal direction or, in essence, in the direction of displacement for the sliding block there are provided free paths of movement or spacings for a defined unhindered movement and rubber-elastic dampeners or shock absorbers. Through the universal joint cage with the provision of a right-angled cutout, this known power transmission linkage arrangement possesses a not negligible requirement for the provision of place or, essentially, an extensive spatial need. Moreover, the installation of this power transmission linkage arrangement; in essence, the coupling device for coupling the gearshift rod which is connected with the transmission of a motor vehicle to a gearshift rod which is connected with the shift lever of the motor vehicle, necessitates a demand on assembly which adversely asserts itself on the manufacturing costs for the coupling device.

SUMMARY OF THE INVENTION

Accordingly, it is an object of the present invention to provide a coupling device of the abovementioned type which is simple in construction and can be simply and inexpensively manufactured, which has only a relatively small spatial requirement, and in order to avoid encountering disturbing transmission power peaks during a shifting procedure possesses good shock-absorbing characteristics, whereby there is concurrently afforded that the shift lever is provided with freedom of play in the direction of shift selection.

The foregoing object is inventively achieved in that there is provided between the interengaging end sections of the two gearshift rods an intermediate element which serves for the damping or absorption of sounds which are conducted through solids, and that fastened to one of the gearshift rods is a cage or housing and fastened to the other gearshift rod is a central body which is encompassed by the cage; whereby the cage possesses two mutually facing, at least approximately radially oriented internal end surfaces and the central body possesses two end surfaces facing away from each other which are at least approximately radially oriented which are located opposite the internal end surfaces of the cage at a spacing therefrom, and wherein spring elements are provided on the two end surfaces of the central body or on the two internal end surfaces of the cage for the dampening of power peaks derived from the transmission. The intermediate element which is arranged between the two gearshift rods serves for the damping or absorption of undesirable sounds conducted through solids which with known coupling devices of the type considered herein are introduced in an undesirable manner from the side of the transmission to the side of the shift lever, and through and resultingly into the passenger compartment of a motor vehicle so as to thereby adversely influence the traveling comfort of passengers. Moreover, the intermediate element possesses the advantage that, even after a lengthy period of utilization of the coupling device, with the aid of the intermediate element there is almost or quasi-precluded any wear of the interengaging end sections of the two gearshift rods. The intermediate element is preferably constituted from a wear-resistant material with a low coefficient of sliding friction, and is preferably fastened to the end section of the one gearshift rod and as a result thereof is telescopably movable with regard to the end section of the other gearshift rod within specified narrow distances or paths of movement. These paths of movement are given in the shifting direction for the gearshift linkage mechanism. In the direction of shifting selection for the gearshift rods, a freedom from play is present between the end sections of the two gearshift rods, so that there is afforded a precise guidance in the shifting selection. The central body which is fixed to the one gearshift rod or, in essence, to its end section, and the cage or housing which is fastened to the other gearshift rod and which encloses the central body, are constructed simply in nature, so that the demand on installation or assembly is extremely low, and the components further evidence only a small requirement for place, so that the inventive coupling device can also be employed in a location which affords the provision of only a small amount of space.

Between the spring elements and the internal surfaces of the cage, in the case that the spring elements are located on the central body; in essence, between the spring elements and the end surfaces of the central body, when the spring elements are arranged on the cage, meaning on the internal surfaces of the cage, there is present a small amount of play in the shifting direction and, as a result, in the longitudinal direction of the shift linkage rods or, in effect, for the coupling device, such that the two gearshift rods are normally uncoupled from each other in an axial direction. During a shifting sequence, advantageously there are not noticeable any disturbing jerking or sudden-like power peaks which are caused, for example, by the synchronization of the transmission. Concurrently, as has already been described, there is afforded that in the direction of shift selection for the shift lever; in effect, during a shifting selection sequence, in which the shift lever is pivoted from one shifting plane into another shifting plane, there is given a freedom from play, so that there is not encountered any adverse influence over the feel of the precise shifting selection. During the implementation of a shifting selection sequence, the above-mentioned spring elements are subjected to a torsional load.

The spring elements are preferably constituted from a wear-resistant plastic material.

A simple construction for the coupling device is obtained when at least the end section of the gearshift rod which connects with the transmission is sleeve-shaped and has an internal cross-section deviating from a circular configuration, and the end section of the gearshift rod which is connected with the shift lever possesses an external cross-section which deviates from a circular configuration, such that a gap is formed between the two interengaging end sections of the gearshift rods which deviates from a circular configuration, and in which there is arranged the intermediate element which effectuates the dampening or absorption of the sounds which are conducted through solids. Due to reasons of obtaining a desired weight reduction, it is understood that not only the end section of the gearshift rod connecting with transmission can be formed hollow sleeve-like, but rather the entire gearshift rod. Based on the same reasoning, preferably also the gearshift rod which is connected with the shift lever can be constructed as a hollow sleeve. In addition to the weight reduction, in this manner there is also improved the mechanical stability with respect to bending strength and torsional strength.

Preferably, the end section of the gearshift rod which connects with the transmission encompasses the end section of the gearshift rod which is connected with the shift lever, and the end sections of the two gearshift rods and the intermediate element all possess correlated annular or ring-shaped cross-sections which deviate from a circular configuration.

The central body can be constructed as an annular or ring-shaped flange which projects radially outwardly from the end of the gearshift rod connected to the transmission which faces towards the other gear shift rod. A simple construction for the coupling device is obtained when, in the last-mentioned construction, the annular flange is equipped with the spring elements on its two end surfaces which face away from each other, and when there is present the already hereinabove discussed play or distance between the spring elements and the opposingly located internal surfaces of the cage in the shifting direction of the coupling device, which by means of engaging or snapping-in actions caused by the transmission or drive gears, is weakened or reduced to such an advantageous and expedient extent that these disturbing procedures or, essentially, effects are no longer noticeable at the shift lever or, in effect, at its actuating or handling knob. Moreover, with the aid of the spring elements, as already previously mentioned, there are additionally attenuated or absorbed the power peaks from the transmission which are caused through synchronization down to values which are no longer discernible, which is applicable for both shifting directions of, for example, an H-shifting system.

In order to be able to always afford symmetrical power relationships in the inventive coupling device, which are necessary for the implementation of a precise shifting selection feel, it has been ascertained as being expedient when the spring elements are arranged on each end surface of the annular flange so as to be symmetrical along a circle extending about the longitudinal axis of the coupling device or; in essence, the shifting direction of the gearshift linkage rods. It is hereby especially advantageous when the spring elements are constructed as knubs or burls which are formed spaced from each other along a suitable circle. The spring elements can, in an advantageous manner, hereby possess progressive spring characteristics. As a result of this construction, power peaks which are produced in the transmission; for example, which are generated due to the engagement of transmission elements, are eliminated quite effectively. Overall, there is accordingly obtained a coupling device, by means of which the tasks set thereon are solved in a simple as well as fully effective manner.

BRIEF DESCRIPTION OF THE DRAWINGS

Further details, features and advantages of the invention can now be more readily ascertained from the following detailed description of an exemplary embodiment of the inventive coupling device, taken in conjunction with the accompanying drawings; in which:

FIG. 1 illustrates a longitudinal sectional view through the end sections of the gearshift linkage rods which are connected with each other secured against relative rotation;

FIG. 2 illustrates a sectional view taken along line II—II in FIG. 1; and

FIG. 3 illustrates, on an enlarged scale, a sectional view taken along line III—III in FIG. 1.

DETAILED DESCRIPTION

FIG. 1 illustrates a coupling device 10 for the coupling of a gearshift rod 12 which is connected with a transmission (not shown) with a gearshift rod 14 which is connected with a shift lever (not shown), whereby in this figure of the drawings, the interengaging and relative to each other rotationally secured end sections 16, 18 of respectively the gearshift rod 12 which is connected with the transmission and the gearshift rod 14 connected with the shift lever are illustrated therein. From FIG. 2 of the drawing, there can be clearly ascertained that the gearshift rod 12, or at least its end section 12, is constructed hollow sleeve-like with a cross-sectional profile which deviates from a circular configuration. The end section 18 of the gearshift rod 15 which is connected with the shift lever is formed with a cross-sectional profile which, as can be ascertained from FIG.

2, is constructed to conform with the cross-sectional profile of the end section 16. The end section 18 of the gearshift rod 14 possesses an external surface 20 whose peripheral dimensions are smaller than the peripheral dimensions of the internal surface 22 of the end section 16 of the gearshift rod 12, so as to cause the formation of a gap 24 between the external surface 20 and the internal surface 22, which gap extends in the peripheral direction about the gear shift linkage rods, and in which gap there is arranged an intermediate element 26. The intermediate element 26 is fixedly connected with the end section 18 of the gearshift rod 14 which extends into the end section 16 of the gearshift rod 12, and is telescopably movable relative to the end section 16 of the gearshift rod 12 which connects with the transmission. Due to the cross-sectional shape of the interengaging end sections 16 and 18 of the gear shift rods 12 and 14 and of the intermediate element 26 which deviate from a circular configuration, there is obtained a connection in the direction of shifting selection, as identified by the double-headed arrow 28 in FIG. 2, between the two gearshift rods 12 and 14 which is secured against relative rotation therebetween and with freedom from play. In contrast therewith, a limited axial movability is afforded between the two gearshift rods 12 and 14 in the shifting direction, as indicated in FIG. 1 by the double-headed arrow 30, whereby the intermediate element 26 serves for the wear-resistant sliding guidance and produces a damping or absorption of sounds which are conducted through solids.

A central body 32 is fastened to the end of the gear shift rod 12 which extends towards the gear shift rod 14, which central body, as can be clearly ascertained from FIG. 3, is constructed as an annular or ring-shaped flange. The central body 32 possess two end surfaces 34 which face away from each other, on which there are fastened spring elements 36. From FIG. 3 there can be ascertained that the spring elements 36 are formed from knubs which are equidistantly spaced from each other along a concentric circle extending about the longitudinal axis 38 of the coupling device. For example, the spring elements 36 are constituted from an elastomeric material.

Fastened to the end section 18 of the gearshift rod 14 which is connected with the shift lever is a cage or housing 40 which has one plate element 42 radially spaced away from the end section 18 of the gearshift rod 14. The plate element 42 is closed off by a ring element 44 of the cage 40. The cage 40 possesses two mutually facing internal surfaces 46 and 48, whereby the coupling device 40 is illustrated in FIG. 1 in a position in which the spring elements 36 which are provided towards the side of the transmission contact against the internal surface 48 of the cage 40, whereas the spring elements 36 which face towards the shift lever possess a small distance or play from the internal surface 46 of the cage 40 adjacent thereto, which distance is designated by s. By means of this distance or play, in essence, for unhindered movement, the snapping-in or engaging effects from the transmission which are caused by the engagement of transmission elements are weakened or reduced to such an extent, that these effects are no longer noticeable at the shift lever. A further advantage of the coupling device 10 consists of in that because of its construction, there is not encountered any adverse influence over a desired feel for a precise shifting selection.

In FIGS. 1 through 3, the same elements are each presently identified by the same reference numerals, so that it is unnecessary to repeatedly describe in detail the individual components in FIG. 3 which are ascertainable from FIG. 1.

In FIG. 3 there are illustrated knub-shaped spring elements 36; however, depending on circumstances, it would would also be possible to provide a spring element 36 on the respective end surface 34 which is in a closed circular configuration. In the same manner, it would also be contemplateable to provide spring elements in the form of mutually concentric circles or, respectively, as knubs arranged along concentric circular lines. In the construction of the spring elements 36 as knubs there is obtained the advantage that the pressing of the surface between the spring elements 36 and the respective internal surface 46 of the cage is improved such that, in an advantageous manner, there is obtained a progressive resilient behavior between the two gearshift rods 12 and 14.

What is claimed is:

1. Coupling device for coupling a first gear-shift rod which is connected with a transmission of a motor vehicle with a second gearshift rod which is connected with a shift lever for the motor vehicle, wherein the two gear-shift rods have mutually interengaging end sections each having a cross-section deviating from a circular shape for forming a connection therebetween secured against relative rotation; an intermediate element for damping sounds conducted through solids being interposed between the interengaging end sections of said gearshift rods, a cage being fastened to one said gearshift rod and a central body being fastened to the other said gearshift rod, said central body being enclosed by said cage, said cage including two facing and at least approximately radially oriented internal surfaces and said central body including two opposingly facing end surfaces which are at least approximately radially oriented located opposite the internal surfaces of the cage at spacings therefrom; and spring elements on either the two end surfaces of the central body or on the two internal surfaces of the cage for attenuating or absorbing power peaks encountered from the transmission.

2. A coupling device as claimed in claim 1, wherein at least the end section of the gearshift rod which is connected with the transmission is sleeve-shaped and has an internal cross-section deviating from a circular shape and the end section of the gear shift rod connected with the shift lever has an external cross-section deviating from a circular shape so as to form a gap between the two interengaging end sections of the gearshift rods which gap deviates from a circular shape; said intermediate element being located in said gap for effectuating the dampening or absorption of said sounds.

3. A coupling device as claimed in claim 1, wherein the end section of the gearshift rod which is connected with the transmission encompasses the end section of the gearshift rod which is connected with the shift lever, the end sections of said gearshift rods and the intermediate element each having annular cross-sections deviating from a circular configuration.

4. A coupling device as claimed in claim 1, wherein said central body comprises an annular flange which projects radially outwardly from the end of the gearshift rod which is connected with the transmission facing the other gearshift rod.

5. A coupling device as claimed in claim 4, wherein said annular flange includes spring elements on the end surfaces thereof which face away from each other, a gap being present between the spring elements and the internal surfaces of the cage located opposite thereof so as to provide a play spacing in the direction of shifting of the coupling device.

6. A coupling device as claimed in claim 5, wherein the spring elements on each end surface of the annular flange are symmetrically arranged along a circle extending about the longitudinal axis of the coupling device and in the direction of shifting of the gearshift rods.

7. A coupling device as claimed in claim 5, wherein the spring elements are formed from knubs spaced from each other in a circular array.

8. A coupling device as claimed in claim 5, wherein the spring elements possess progressive spring characteristics.

* * * * *